United States Patent
Haeberer et al.

(10) Patent No.: US 8,292,024 B2
(45) Date of Patent: Oct. 23, 2012

(54) RETAINER DEVICE FOR A REDUCING AGENT METERING VALVE

(75) Inventors: Rainer Haeberer, Bretten (DE); Burghard Kienzle, Leonberg-Höfingen (DE); Siegbert Griesinger, Oetisheim (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 12/521,476

(22) PCT Filed: Nov. 15, 2007

(86) PCT No.: PCT/EP2007/062367
§ 371 (c)(1),
(2), (4) Date: Sep. 15, 2010

(87) PCT Pub. No.: WO2008/080687
PCT Pub. Date: Jul. 10, 2008

(65) Prior Publication Data
US 2010/0326547 A1    Dec. 30, 2010

(30) Foreign Application Priority Data
Dec. 28, 2006    (DE) .................. 10 2006 061 733

(51) Int. Cl.
*F16F 7/00* (2006.01)
(52) U.S. Cl. ........ 181/207; 181/212; 181/237; 181/254; 137/560

(58) Field of Classification Search .................. 181/207, 181/212, 237, 254; 137/560
See application file for complete search history.

(56) References Cited

U.S. PATENT DOCUMENTS

| | | | | | |
|---|---|---|---|---|---|
| 1,017,536 | A | * | 2/1912 | Graydon | 181/237 |
| 2,201,363 | A | * | 5/1940 | Campbell | 181/237 |
| 2,323,891 | A | * | 7/1943 | Blanchard | 181/238 |
| 3,187,834 | A | * | 6/1965 | Cassilly et al. | 181/283 |
| 3,473,626 | A | * | 10/1969 | Toda et al. | 181/237 |
| 3,477,227 | A | * | 11/1969 | Stevens et al. | 60/295 |
| 3,590,945 | A | * | 7/1971 | Murphy | 181/240 |
| 4,763,754 | A | * | 8/1988 | Coppolani et al. | 181/237 |
| 4,934,343 | A | * | 6/1990 | Lee | 181/206 |
| 6,230,488 | B1 | * | 5/2001 | Voss | 60/298 |
| 6,298,753 | B1 | | 10/2001 | Izumisawa | |
| 2005/0067218 | A1 | * | 3/2005 | Bristow et al. | 181/237 |
| 2007/0251503 | A1 | * | 11/2007 | Buehner | 123/470 |
| 2008/0283718 | A1 | * | 11/2008 | Tsuge | 248/562 |
| 2010/0146952 | A1 | * | 6/2010 | Haeberer et al. | 60/303 |

FOREIGN PATENT DOCUMENTS
EP    2126300 B1    3/2010
JP    2004176587 A    6/2004

\* cited by examiner

*Primary Examiner* — Forrest M Phillips
(74) *Attorney, Agent, or Firm* — Michael Best & Friedrich LLP (57) ABSTRACT

The invention relates to a retainer device for retaining a reducing agent metering valve. The retainer device at least partially surrounds an interior space which is provided for holding the reducing agent metering valve. According to the invention, the retainer device has a sound dampening device which dampens sound vibrations emerging from the interior space.

21 Claims, 5 Drawing Sheets

RETAINER DEVICE FOR A REDUCING AGENT METERING VALVE

CROSS-REFERENCE TO RELATED APPLICATION

This application is a 35 USC 371 application of PCT/EP 2007/062367 filed on Nov. 15, 2007.

BACKGROUND OF THE INVENTION

Field of the Invention

The invention is based on a metering module for liquid reducing agents that are introduced into an exhaust system to reduce nitrogen oxides. The liquid reducing agent is stored in a tank and is supplied to the metering module via a line from the tank. The metering module includes a metering valve, which is received by a retainer device or an adapter. This adapter is secured with the metering valve to the tailpipe.

During operation, the valve is switched, causing vibration. This leads to unwanted noise.

SUMMARY OF THE INVENTION

The invention makes economical noise suppression possible and does not require additional effort or expense upon assembly. At the same time, the noises caused by the switching of the reducing agent metering valve are effectively suppressed. The invention furthermore permits effective suppression of both structure-borne sound and airborne sound and simultaneously makes it possible to secure the metering valve in a stable way.

The invention provides a retainer device which is capable of retaining a reducing agent metering valve and furthermore effectively acoustically insulates the inner chamber in which the reducing agent metering valve is provided. In one aspect of the invention, the retainer device serves on the one hand for securing the reducing agent metering valve and on the other for damping the vibration caused by the reducing agent metering valve. A further aspect of the invention is that the retainer device at least partially absorbs vibration of the metering valve and as a result damps both airborne sound and structure-borne sound. A further aspect of the invention is to suppress the transmission of structure-borne sound or vibration from the metering valve to the retainer device and/or from the retainer device to an exhaust system guide device that can be connected to it, and as a result to damp the output of structure-borne sound and airborne sound. A further aspect of the invention provides damping of structure-borne sound particularly by damping longitudinal vibration in the longitudinal direction of the metering valve, since the vibration produced by the metering valve extends above all in the longitudinal direction of the metering valve. In a further aspect of the invention, the retainer device also damps sound that has been transmitted from the reducing agent metering valve to the surrounding air space. In some embodiments of the invention, it is above all the high-frequency component of the sound generated by the metering valve that is damped.

According to the invention, the retainer device surrounds an inner chamber for receiving the reducing agent metering valve and includes a sound-damping device, for reducing the sonic vibrations emerging from the inner chamber.

In this way, the retainer device retains the reducing agent metering valve in its place and furthermore enables the damping of sound that is generated by the metering valve.

First, the vibrations of the reducing agent metering valve are transmitted to the inner contact face of the retainer device, preferably by an elastic element that dampens the vibrations.

Next, the sound can be reduced by two different ways. In one, the retainer device includes one or more elastic elements that are in direct mechanical contact with the reducing agent metering valve. In this way, the elastic element or elements can absorb the vibrations that are caused by the reducing agent metering valve. Moreover, it is thus attained that only a small proportion of the vibrations is transmitted to the static outer parts of the retainer device.

Second, vibrations that have been output from the reducing agent metering valve into the air are attenuated by means of airborne-sound-damping elements, which are provided by the retainer device in the vicinity of or directly at the reducing agent metering valve. In one aspect of the invention, these airborne-sound-damping elements provide increased flow resistance for air, for instance by means of a perforation matrix that reduces the sound threshold of the air on passage through the air. As the airborne-sound-damping elements, all devices that present increased flow resistance for air flowing through, such as suitable fabrics, are therefore suitable. Particularly in the head region of the retainer device, in which the circuit element of the reducing agent metering valve is provided, in which the vibrations are primarily generated, the surrounding retainer device preferably has many small openings or bores, which by means of increased flow resistance damp the airborne sound occurring there. As a result, the airborne sound, passing radially outward from the metering valve through the retainer device is damped directly upon passage by the corresponding mechanical damping structure of the retainer device. Moreover, the mechanical structure provided there reduces the structure-borne sound.

Preferably, the vibrational energy is reduced by interference, which corresponds to wide-band filtering. Moreover, the surface that is provided in the head region and that projects the structure-borne sound is reduced to a minimum by the openings. Nevertheless, the provision of openings does not impair the mechanical stability of the retainer device. Moreover, as a result of the air passage, an increased cooling action of the retainer device is obtained.

Perforations are provided, particularly in the head region of the retainer device, because of interference in the immediate surroundings of the vibrating mechanical structure the various vibrations that are caused by the retainer device are superimposed destructively on one another. Once again, this leads to wide-band filtering action with regard to the sound emitted.

According to the Huygens principle, the individual perforations or openings distributed along the retainer device are considered to be individual sound sources that at least partially cancel one another out by mutual superposition. Once again, this leads to wide-band filtering or damping. Accordingly, in a further aspect of the invention, the retainer device provides damping by means of phase-offset vibration superposition. Because of the guided air flow, an at least partial mutual cancellation can thus be attained for the exterior action of the individual openings.

Preferably, the retainer device includes a head region that cylindrically surrounds a head room. This head room surrounded cylindrically along its circumference can receive a reducing agent metering valve, which likewise has a cylindrical shape. According to the invention, in the head region of the retainer device, sound-damping openings are provided, which are diametrically opposite the reducing agent metering valve when the latter is built into the head room. The cylindrical circumferential surface of the reducing agent metering valve is thus surrounded cylindrically by the head region of the retainer device and thus damps the airborne sound, emitted by the circumferential outer surface of the metering valve, in a direct way by means of damping by increased flow resistance. The portion of the reducing agent metering valve received in the head room preferably includes a closing portion of the valve, in which a mechanism for opening and closing the valve, for instance by means of an actuator, is provided; this mechanism generates the structure-borne sound, especially in the longitudinal direction of the valve. As already noted, the increased flow resistance is provided by the sound-damping openings. In this structure, the airborne-sound-damping elements are therefore provided in the direct propagation direction of the airborne sound.

In an embodiment of the retainer device, this device includes cooling ribs, which extend perpendicular to a longitudinal axis of the retainer device. The cooling ribs are preferably disposed in a radial plane that is perpendicular to the longitudinal axis of the retainer device. The cooling ribs are preferably disk-shaped and rotationally symmetrical to the longitudinal axis of the retainer device. The cooling ribs serve to dissipate heat from the reducing agent metering valve. Since for the sake of heat dissipation, the cooling ribs are provided close to the reducing agent metering valve and preferably have mechanical contact with it, they have a substantial influence on the conduction of sound. According to the invention, the cooling ribs therefore include openings, which restrict the transmission of both airborne sound and structure-borne sound. These openings are disposed perpendicular to the plane of the cooling ribs and preferably parallel to the longitudinal axis of the retainer device. By the provision of the openings, the cooling ribs experience an increasing flow through them of the ambient air, and as a result better heat dissipation to the ambient air can simultaneously be attained.

In a further embodiment of the invention, at a connection point which serves to secure it to an exhaust system, the retainer device has a sealing element which seals off the reducing agent metering valve that it receives. For sealing purposes, an elastic element is preferably used, which connects the reducing agent metering valve in gastight fashion to an exhaust system connection portion. Simultaneously, the seal is used according to the invention for damping the structure-borne sound that originates at the reducing agent metering valve. In a first embodiment, the seal surrounds a line which communicates with the metering valve and leads away from the metering valve. In a further embodiment, the seal furthermore partially or completely surrounds the circumferential outer surface of the reducing agent metering valve. In this way, a seal can be provided which extends as far as the head region of the retainer device and can furthermore extend into the head region of the retainer device, which on the one hand seals off the reducing agent metering valve and on the other insulates it in terms of sound emission. The seal's elasticity, which is required for the sealed connection of the metering valve, therefore meets the goal of sound-damping as well.

A device according to the invention provides an elastic retention element for the reducing agent metering valve, which has a very slight spring rigidity in the longitudinal direction, that is, the axial direction of the metering valve. Since the actuator provided in the metering valve generates structure-borne sound in the form of longitudinal vibrations, above all from severe decelerations in the longitudinal direction, the metering valve can at the same time be well damped and retained in the radial direction. Elastic elements are provided which are suitable for retaining the metering valve in the retainer device and which insulate the metering valve relative to the retainer device with regard in particular to high-frequency longitudinal vibration components.

In addition, these and/or further components of the retainer device are suitable for damping vibration by absorption. This can be provided for instance by means of a number of crimped, press-fit or adhesive connections that join individual sheet-metal parts of the retainer device to one another. Moreover, parts of the retainer device can be recessed, in order to provide a very low rigidity in the axial direction of the reducing agent metering valve and at the same time to attain good radial stability, for instance by recessing metal sheets with low thicknesses in the axial direction and with hollow ribs extending comparatively far radially.

The provisions for airborne sound damping can be combined arbitrarily with the provisions for structure-borne sound damping; for instance, the axially highly elastic hollow ribs may have small openings for airborne sound damping. It is equally possible for sheet-metal portions or components comprising elastic materials to be used, examples being elastomers, that absorb structure-borne sound and at the same time suppress the transmission of structure-borne sound.

According to the invention, an adapter is moreover provided, which includes a retainer device of the invention, as well as contact elements for connection of a reducing agent supply, as well as contact elements for connection to an exhaust system. The contact elements may be screw connections, flanges, or bayonet mounts, or an arbitrary combination of these. Preferably, the openings and the geometric dimensions of the various contact elements are adapted to the respective connection.

BRIEF DESCRIPTION OF THE DRAWINGS

Exemplary embodiments of the invention are described, below in conjunction with the drawings, in which:

FIG. 3b is the cross section of the rib shown in FIG. 3a, which is disposed in the lower portion of the head part of FIG. 3a;

FIG. 4b is a detailed mechanical circuit diagram of the embodiment in FIG. 4a;

FIG. 4c shows a simplified mechanical circuit diagram of the embodiment in FIG. 4a;

DESCRIPTION OF THE PREFERRED EMBODIMENTS

Figure 1:
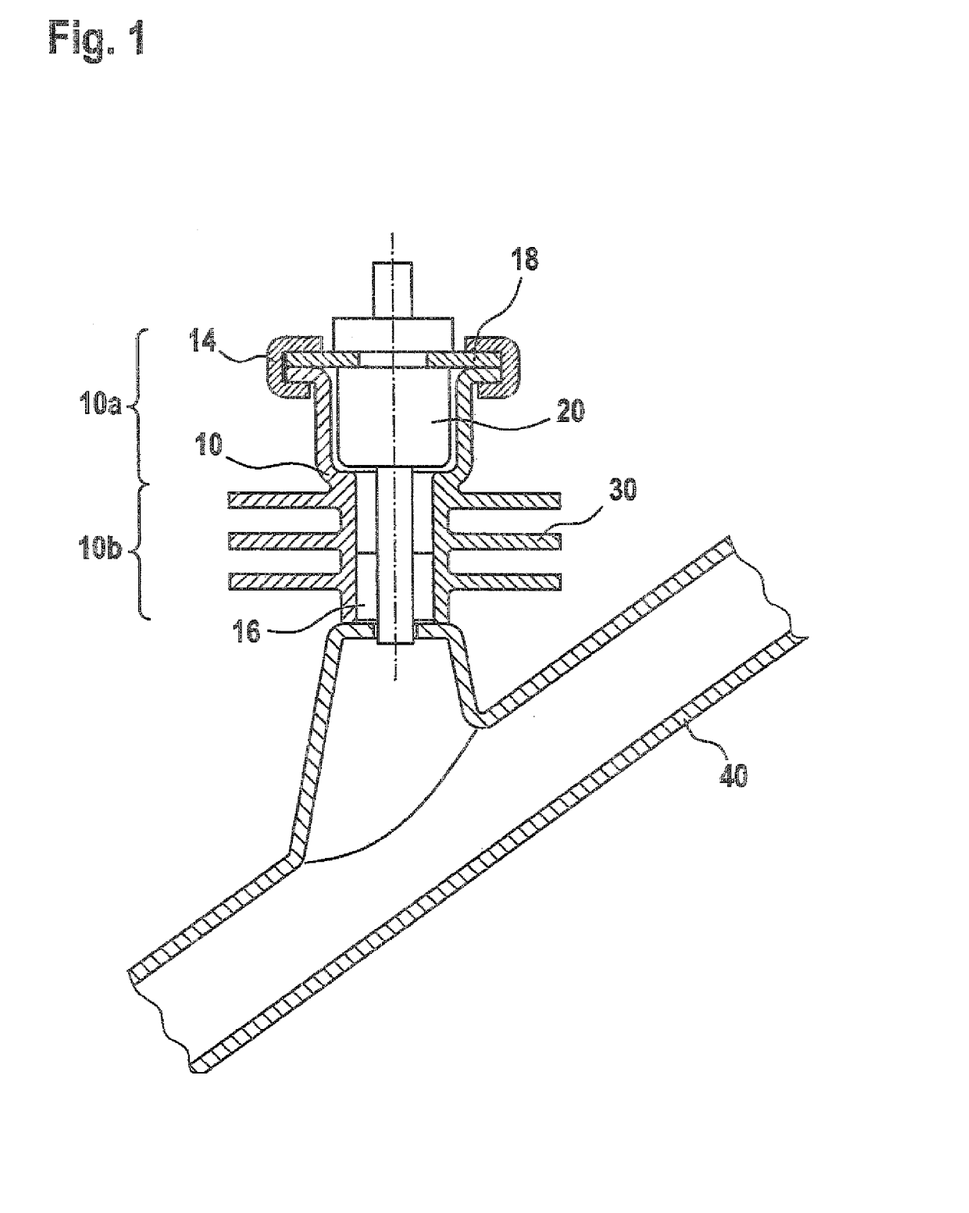
FIG. 1 shows a retainer device, with a reducing agent metering valve received therein, and an exhaust system to which the retainer device is secured.

In FIG. 1, a retainer device 10 is shown, which is intended for retaining a reducing agent metering valve 20. The retainer device has an essentially cylindrical inner chamber, which circumferentially surrounds the reducing agent metering valve 20 provided in it. The upper part of the retainer device 10 includes a head portion 10a, which includes the closing portion of the reducing agent metering valve 20. In this closing portion of the metering valve, an actuator, which is provided for valve control, generates the closing noises that are to be damped. The closing portion of the reducing agent metering valve is adjoined by a tube which connects the closing portion with the inner chamber of the exhaust system 40. A supply line portion 10b of the retainer device 10 of the invention surrounds this tube. Since the tube has a smaller diameter than the closing portion of the metering valve 20, the surrounding supply line portion 10b is also smaller in diameter than the head region portion 10a of the reducing agent metering valve. In the supply line portion 10b of the retainer device, a seal 16 serves to seal the tube of the reducing agent metering valve with the supply line portion 10b of the retainer device 10. The seal preferably includes an elastic material. The tube of the reducing agent metering valve passes through an opening in the exhaust system 40, and at the point of passage there is preferably minimal spacing between the outside of the tube and the opening of the exhaust system 40. This minimal spacing is advantageously designed such that despite a motion, caused by vibration, of the tube of the reducing agent metering valve, there is still adequate spacing from the opening of the exhaust system provided to avoid the transmission of structure-borne sound from the reducing agent metering valve to the exhaust system-guide via the tube.

The head region 10a of the retainer device 10 of the invention, on an upper end of the head portion 10a, has an outward-oriented bulge, which extends perpendicular to the longitudinal axis of the retainer device 10. A disk ring 18, which is likewise embodied perpendicular to the longitudinal axis of the retainer device 10, rests on the bulge. A clip or clamp 14 surrounds the disk ring 18 and the bulge circumferentially in a resilient press fit, so that the disk ring 18 is pressed against the bulge. At the same time, the disk ring has an inner concentric opening, in which the reducing agent metering valve can be retained on an upper end of the closing portion that preferably has a groove engaged by the disk ring 18. In this way, the reducing agent metering valve is retained not only at a first point on the tube by the seal 16 but also at a second point by the disk ring 18, which is disposed on the opposite end of the reducing agent metering valve.

Preferably, the inner surface of the retainer device defines an inner chamber which can receive the reducing agent metering valve 20, and a minimal spacing is still assured between the outside of the reducing agent metering valve and the inside of the retainer device. This minimal spacing assures that vibration of the reducing agent metering valve is not transmitted directly to the retainer devices. The seal 16 provided on the lower end in the supply line region 10b of the retainer device 10 is already embodied elastically for the sake of the sealing function and thus allows damping of the vibration and at the same time reduces transmission of the structure-borne sound from the metering valve 20. On the upper end of the head portion 10a of the retainer device 10, the disk ring keeps the reducing agent metering valve 20 in position. Since the disk ring 18 is embodied for engaging a groove in the reducing agent metering valve, the disk ring 18 is preferably embodied elastically for the sake of better assembly. At the same time, the elasticity of the disk ring 18 can be provided in order also to avoid transmission of vibration from the reducing agent metering valve 20 at the upper end of the retainer device 10a and at the same time to absorb that vibration.

In summary, the retainer device 10 of the invention provides a two-point retention for the reducing agent metering valve, which because of the respective elastic suspension suppresses the transmission of structure-borne sound from the reducing agent metering valve to the retainer device. Thus the retainer device can be mounted directly on the exhaust system 40, without there being the risk that substantial components of the noise from the metering valve will be transmitted to the motor vehicle.

In further embodiments of the retainer device of the invention, the seal 16 also surrounds parts of the closing portion of the reducing agent metering valve, to provide further sound-damping. The disk ring 18 may also besides elastic material, have additional perforations, which damp airborne sound by means of increased flow resistance. Moreover, in a preferred embodiment of the invention, the supply line portion 10b of the retainer device has cooling ribs 30, which extend radially away from the longitudinal axis of the retainer device 10. They are preferably equipped with openings which extend in the direction of the longitudinal axis and likewise contribute to damping airborne sound that is emitted by the retainer device. Moreover, the head portion 10a of the retainer device 10 includes perforations which extend radially outward essentially perpendicular to the longitudinal axis, in order to damp the airborne sound that is emitted radially outward from the closing portion of the reducing agent metering valve 20. On the one hand, the openings in both the head region and the cooling ribs provide damping by flow losses from air vibrations, and on the other, they provide damping by interference or diffraction by phase-offset vibration superposition under the individual openings. Preferably, a wide-band filtering action is attained by this airborne sound damping, and the individual openings can be interpreted as individual sound sources, whose mutual interference leads to the wide-band filtering or damping.

By means of the openings or perforations in the cooling ribs, it is furthermore attained that the structure-borne sound-emitting rib surface area is reduced, and in particular in the space between the individual ribs, interference, diffraction and reflection effects lead to further damping effects. In one embodiment, the ribs are made from whisper metal, which comprises two partial metal sheets between which sound-damping material is placed. The ribs may furthermore be made from perforated sheet metal. For further damping, sound-absorbing materials such as steel wool or fabric with similar effects may be employed; these materials are preferably disposed around the head region of the retainer device and/or between or on the cooling ribs. These damping materials, because of how they are disposed, on the one hand prevent the emission of airborne sound and on the other the damping of already-emitted airborne sound that is to be encountered in the vicinity of the retainer device.

In an embodiment not shown, the head portion 10a also has radially outward-extending cooling ribs 30, which are likewise preferably equipped with perforations in order to damp the airborne sound. On the lower end of the retainer device 10, which adjoins the exhaust system 40, a screw connection, plug connection or flange connection is preferably provided, in order to permit assembly of the retainer device with the exhaust system 40. The upper head end of the reducing agent metering valve also preferably provides a connection element, which for example provides a screw connection, plug connection, or flange connection. In a further embodiment, the clip 14 is provided in resilient or damping form and therefore provides further damping of the structure-borne sound.

Figure 2:
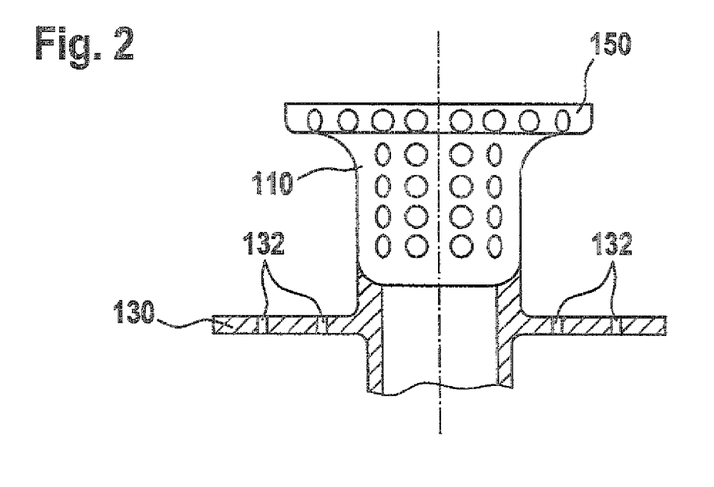
FIG. 2 shows the head region of one embodiment of the retainer device of the invention.

In FIG. 2, a head region 110 and a cooling rib 130 are shown. The head region 110, which is suitable for receiving a closing portion of a reducing agent metering valve 20, has many small openings. The head region furthermore has a radially outward-oriented portion 150, which defines a contact face for a disk ring. The openings have a relatively small diameter, for instance between 0.05 mm and 2 mm, and can be punched or drilled into a metal sheet that forms the retainer device. Preferably, the diameter of the openings is between 0.1 mm and 1 mm. In an especially preferred embodiment, the diameter of the openings is between 0.2 min and 0.5 mm. The openings are preferably disposed regularly, for instance in rows. Alternatively, each opening may have the same spacing from all its respective direct neighbors. In the cooling rib 130 shown, openings 132 are also provided, which extend parallel to the longitudinal axis of the retainer device and serve to provide damping. In general, because of the small diameter of the openings, eddies are created, which along with the increased flow resistance lead to further deceleration of the speed of airborne sound. The perforated cooling rib, in comparison to an unperforated cooling rib, also has a reduced effective sound-emitting surface area.

Figure 3A:
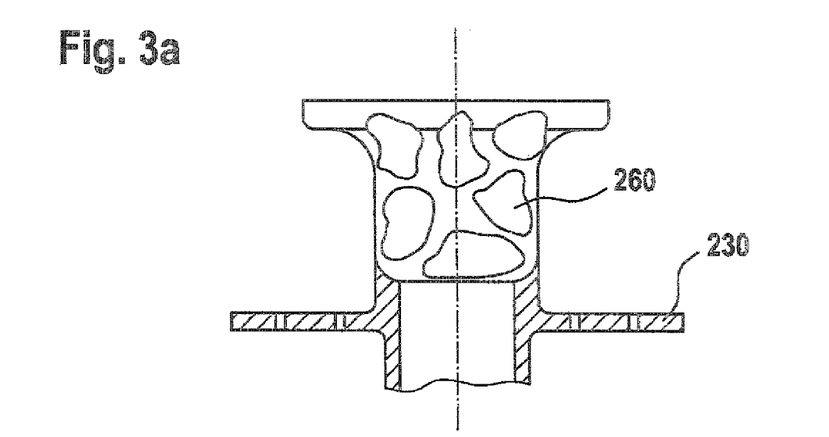
FIG. 3a shows the head region of a further embodiment of the retainer device of the invention.
Figure 3B:
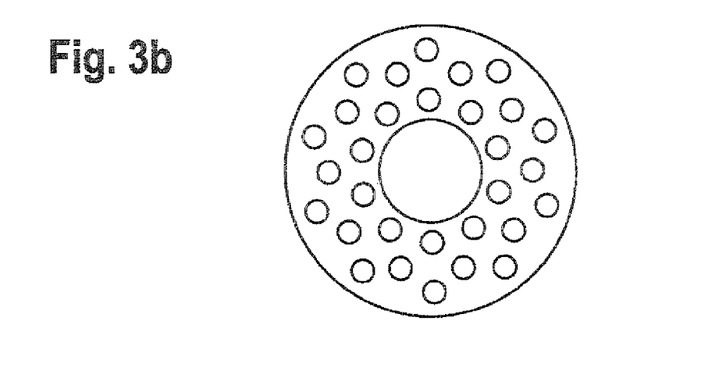

In FIG. 3, a head region of a further embodiment of a retainer device of the invention is shown, which once again includes openings 260. However, the openings shown in FIG. 2 are circular and have a small diameter, while the openings 260 in FIG. 3 are larger and have an irregular shape. Because of diffraction effects and interference at the inner edge of the openings 260, differential effects and diffraction effects occur, which contribute to further damping. These diffraction and differential effects also result with the openings shown in FIG. 2. The head region of the retainer device shown in FIG. 3a furthermore has a cooling rib 230, which is shown in cross section in FIG. 3b.

The openings in the cooling rib shown in FIG. 3b are distributed uniformly about the center point of the cooling rib and are preferably round. The openings may form concentric rings and may have a uniform radial spacing from one another. According to the invention, the retainer device provides means that reduce the emergence of sound from the metering valve as airborne sound into the air and as structure-borne sound into securing elements. On the one hand, the vibrations of the reducing agent metering valve are damped directly by means of elastic retention, for instance by means of elastic materials or springs, and on the other, the transmission of thereby-generated structure-borne sound to further vehicle parts is likewise suppressed by elastic materials or springs. Moreover, emitted airborne sound is reduced by the use of airborne-sound-damping elements, which are based on the principle of increased flow resistance of small openings as well as on eddies. Damping effects are furthermore result from diffraction and interference at the openings. The openings are preferably provided with a small diameter and are provided in the head region of the retainer device and/or in radially extending cooling ribs. The openings in the cooling ribs damp airborne sound that has already emerged from the retainer device, while the openings in the head region of the retainer device damp the transmission of airborne sound from the interior of the retainer device into the surroundings. For damping the already-emitted airborne sound and to reduce the emission of airborne sound by means of structure-borne sound, in addition to openings embodied as through holes, openings embodied as blind bores are also suitable.

Preferably, the reducing agent metering valve is made to communicate with the reducing agent tank via a damping connection, to prevent structure-borne sound from being transmitted from the reducing agent metering valve to vehicle parts via the reducing agent tank or the fluid connection leading to it.

In general, the propagation of sound in the case of structure-borne sound is damped by sudden changes in impedance of the acoustic medium, for instance the use of rubber or spring elements, which are coupled to rigid elements that are subject to vibration.

Figure 4A:
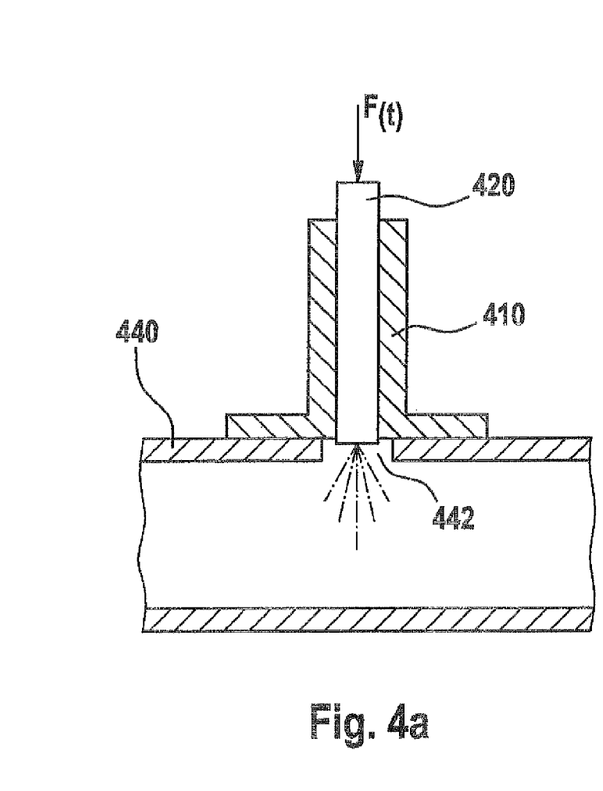
FIG. 4a shows a basic illustration of a technical embodiment of the retainer device of the invention.
Figure 4B:
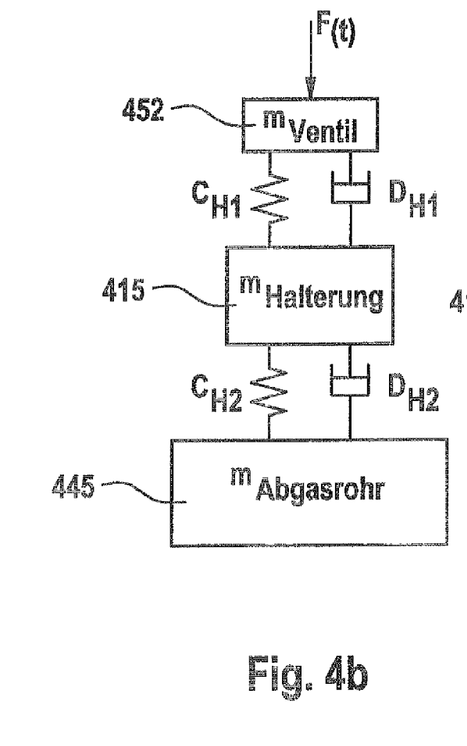
Figure 4C:
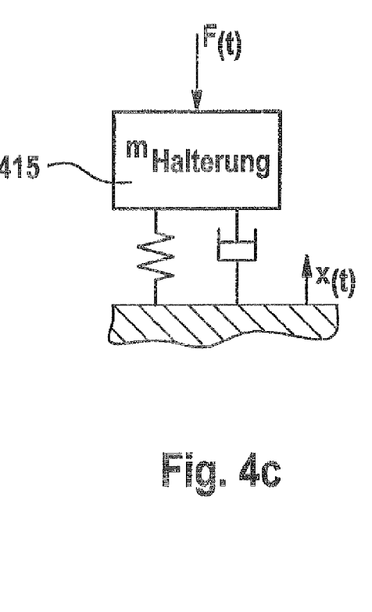

FIG. 4a shows a technical embodiment of the retainer device of the invention in a further aspect of the present invention, and FIG. 4b shows the corresponding mechanical substitute model in detail, and FIG. 4c shows the mechanical substitute model in simplified form.

FIG. 4a shows an exhaust system guide device in the form of a tailpipe 440, which has an opening 442. Through this opening 442, reducing agent is injected into the exhaust system. The retainer device 410 is therefore mounted on the tailpipe 440 at the level of the opening 442, and the metering valve 420 is fitted concentrically into the middle of the retainer device. In the metering valve 420, a valve armature is provided, which moves when the metering valve is switched and strikes the valve seat in the longitudinal direction of the metering valve. The retainer device of the invention is typically used for metering valves whose actuator device executes a motion along the longitudinal axis, the motion being employed for switching the metering valve. The noise produced upon switching of the metering valve is engendered essentially by this motion in the longitudinal direction, especially when the motion is rapidly braked, for instance by means of the mechanical contact between the valve armature and the valve seat. If damping is inadequate, this switching noise that essentially causes the noise irritation is transmitted to the tailpipe, which amplifies it because of the large outer surface area of the tailpipe. In the aspect of the invention shown in FIGS. 4a-4c, it is the damping of the structure-borne sound, which is caused by the impact inside the metering valve along its longitudinal axis, that is considered in particular.

According to the invention, the frequency response is looked at in terms of the type of noise caused for instance by the impact of the valve armature striking the valve seat. The retainer device in this aspect of the invention therefore provides coupling with a pronounced low-pass response, so that high-frequency longitudinal vibration generated in the metering module is damped especially strongly by the retainer device of the invention. For this reason, the mode of operation and the longitudinal force F (t) acting on the metering valve are taken into consideration, and the retainer device of the invention is embodied on the basis of these.

FIG. 4b shows the mechanical substitute model of the technical embodiment of FIG. 4a, in which a force F (t), which is generated by the switching impetus of the metering valve, acts initially on the valve mass 425. This valve mass is connected to the mass 415 of the retainer device via a spring element $C_{H1}$, which represents the spring rigidity of the metering valve retainer, and the damping element $D_{H1}$, which represents the damping of the metering valve retainer. This mass 415 is connected in turn to the mass 445 of the tailpipe via a spring element $C_{H2}$ and the damping element $D_{H2}$. Here, $C_{H2}$ and $D_{H2}$ represent the spring rigidity and the damping, respectively, of the mechanical connection between the retainer device and the tailpipe. In other words, the metering valve mass 452 is connected to the mass 415 of the retainer device via a damped spring element ($C_{H1}$, parallel to $D_{H1}$). The mass 415 of the retainer device in the substitute model is in turn connected to the mass 455 of the tailpipe via a damped spring element (spring element $C_{H2}$, parallel to damping element $D_{H2}$). The damped spring element between the mass 415 of the retainer device 410 and the mass 445 of the tailpipe 440 thus represents the damping and the spring rigidity of the mechanical connection between the retainer device 410 and the tailpipe 440. To provide the coupling of the metering valve to the tailpipe with a pronounced low-pass response according to the invention, a large adapter mass, low adapter rigidity, or high damping between the valve and the tailpipe, or a combination of these, may for instance be provided.

FIG. 4c shows a simplified mechanical circuit diagram of the linkage among the metering valve, retainer device, and tailpipe, which is shown in FIG. 4b. Essentially, the force generated by the switching engages the retention mass, which is connected to a fixed plane (the tailpipe) via a damped spring system that corresponds to the connection properties of the retainer device. It can also be learned from the circuit diagram of FIG. 4c that for a pronounced low-pass response, that is, strong damping of the high frequencies, a high mass of the retainer device, a low rigidity of the retainer device, and/or high damping between the metering valve and the tailpipe can be generated.

In a first principle, the metering valve is coupled as softly as possible to the tailpipe, in order to provide a very low spring rigidity of the mechanical connection between the metering valve 420 and the tailpipe 440.

To achieve this, in one embodiment of the invention, the metering valve is suspended flexibly in the retainer device 410. The flexible suspension, that is, the suspension that is elastic in particular in the longitudinal axis of the metering valve (and of the retainer), is provided for instance by using an elastic material. Suitable examples for this are rubber or spring elements, for instance of metal, with a long spring travel and low rigidity.

Figure 5:
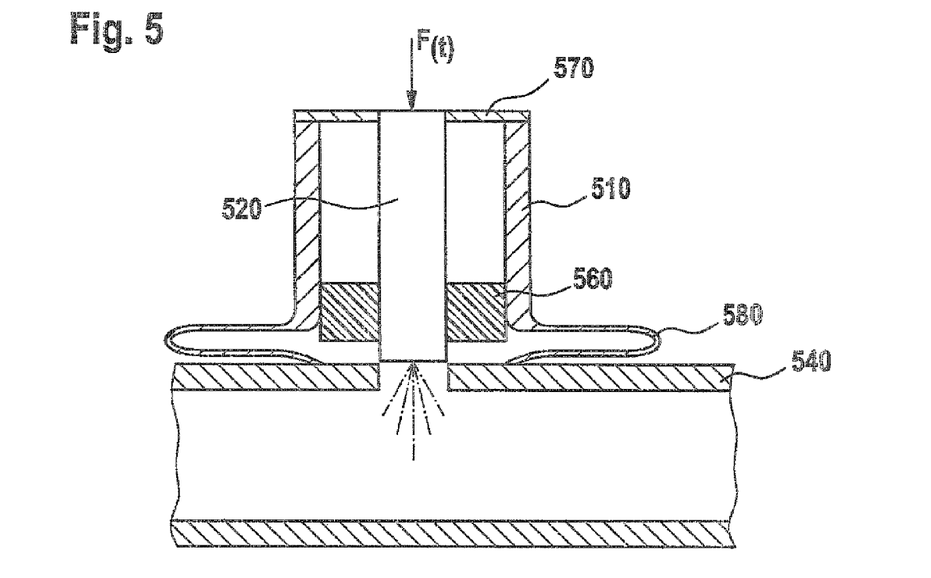
FIG. 5 shows an embodiment of the invention for damping longitudinal vibrations by means of axially or longitudinally elastic retention elements.

FIG. 5 shows both suspension options. In FIG. 5, a radial fixation by means of a mass an elastic damping element 560 of elastic material is shown. Thus in the radial direction a certain rigidity to the stable radial suspension of the metering adapter is provided, and at the same time, in the vertical direction, that is, along the longitudinal axis of the metering valve, a soft suspension, in particular for damping high-frequency structure-borne sound components, is provided. The soft elastomer damping element 560 serves the purpose of radial guidance and is embodied as a ring, whose inner surface is in direct mechanical contact with the metering valve 520, for instance by a press fit, and whose outer surface touches the inner surface of the retainer device with a press fit. Therefore when radial motions occur, that is, motions perpendicular to the longitudinal axis of the metering valve, the press rigidity for longitudinal displacements of the elastic material, that is, in the radial direction, comes into play. In the case of vertical motions, that is, along the longitudinal axis of the metering valve, the metering valve 520 exerts shear forces on the elastic damping element 560, so that in the vertical direction, a lesser rigidity is provided. In other words, for the same spring travel in the radial direction, the elastic damping element 560 has a markedly higher restoring force than for the same spring travel in the vertical direction, since in the vertical direction shear forces are spring-loaded, while conversely in the radial direction, longitudinal forces are spring-loaded. Via the elastic material between the metering valve and the retainer device, vibrations that are transmitted from the metering valve to the retainer device are therefore damped. Furthermore, for securing the elastic material 560, an adhesive connection may be employed.

In the same way, to reduce the vibrations that are transmitted from the metering valve 520 to the retainer device 510, a flexible axial suspension 570 is provided, which has a very slight rigidity in the longitudinal direction of the metering valve and which offers a second suspension for the metering valve. At the same time, the flexible axial suspension 570 provides greater rigidity in the radial direction and in particular strong damping of high-frequency structure-borne sound. In a preferred embodiment of the invention, a flexible sheet-metal hoop is used as the flexible axial suspension, and the corresponding spring rigidity is attained by means of a low thickness of the sheet metal. Still other elastic materials may also be used, such as rubber or other elastomers.

The flexible axial suspension 570 is provided on an end of the metering valve 520 that is disposed remote from the tailpipe, while conversely, the elastic damping element 560 is provided on the opposite end of the metering valve, that is, the end located at the tailpipe 540. As a result, an elastic axial suspension is provided which simultaneously has a certain radial rigidity, in order to keep the metering valve in place. Thus the flexible axial suspension 570 and the elastic damping element 560 greatly reduce the axial vibration of the metering valve, that is, along its longitudinal axis, to the retainer device 510.

In a further preferred embodiment, a further provision is made, for reducing transmission in particular of axial vibration from the retainer 510 to the tailpipe 540, and at the same time, a certain radial guidance or rigidity should continue to be assured. The embodiment of the invention shown in FIG. 5 therefore includes an elastic coupling of the retainer device to the tailpipe via a hollow rib 580 of low wall thickness. The spring rigidity in the axial direction of the hollow rib is due both to the ratio of length to thickness of the hollow rib and material coefficients. The hollow rib is therefore provided as a wide everted portion, whose radial extent is markedly greater than the wall thickness. At the same time, it requires only little space in the axial direction since the hollow rib is embodied as a loop, whose end is located in the vicinity of its beginning. Moreover, the spacing between the beginning and end of the hollow rib should be such that vibrations of a certain maximum amplitude can be intercepted without the beginning and end of the loop of the hollow rib 580 touching one another. Preferably, the hollow rib is embodied in one piece with the retainer device 510, and alternatively, the hollow rib may also be pressed against or glued to the retainer device 510. Moreover, in a two-part embodiment, the retainer device 510 may be of a material that has greater rigidity that the material of the hollow rib 580. In the one-part embodiment, the wall thickness of the retainer device 510 can be markedly greater than the wall thickness of the hollow rib, which in turn, as already noted, is definitive for the spring properties of the hollow rib.

The hollow rib 580, the upper retainer or axial suspension 570, which is elastic particularly in the axial direction, and the lower retainer or elastic damping element 560, which is likewise elastic in particular in the axial direction, damp the transmission of structure-borne sound. While the upper and lower retainers damp the transmission from the metering valve to the retainer device 510, the hollow rib, because of its great elasticity in the axial direction, is intended for reducing the transmission of structure-borne sound from the retainer device 510 to the tailpipe 540. In these elements 560, 570 and 580, it is important above all that they yield in the axial direction, to hinder the transmission of the structure-borne sound that to a great extent occurs in axially oriented form, or in other words axial vibration. Moreover, these elements close off the air space between the metering valve and the retainer device and as a result simultaneously damp the airborne sound. Furthermore, the damping elements 560, 570 and 580 have a vibration-absorbing effect, which can be amplified by means of suitable materials (rubber, whisper metal) and structures (perforations).

In a further principle to increase particularly the damping of axial vibration, high damping is provided between the metering valve and the tailpipe. The embodiment shown in FIG. 6 therefore has mechanical connections, which have especially high damping. The adapter is therefore preferably constructed from individual sheet-metal parts, which are joined together via crimped connections. The crimped connections are provided to generate high material damping inside the adapter. As a result, the vibration generated by the metering valve can be attenuated. In particular, crimped connections make it possible to damp high-frequency structure-borne sound or vibrations.

Figure 6:
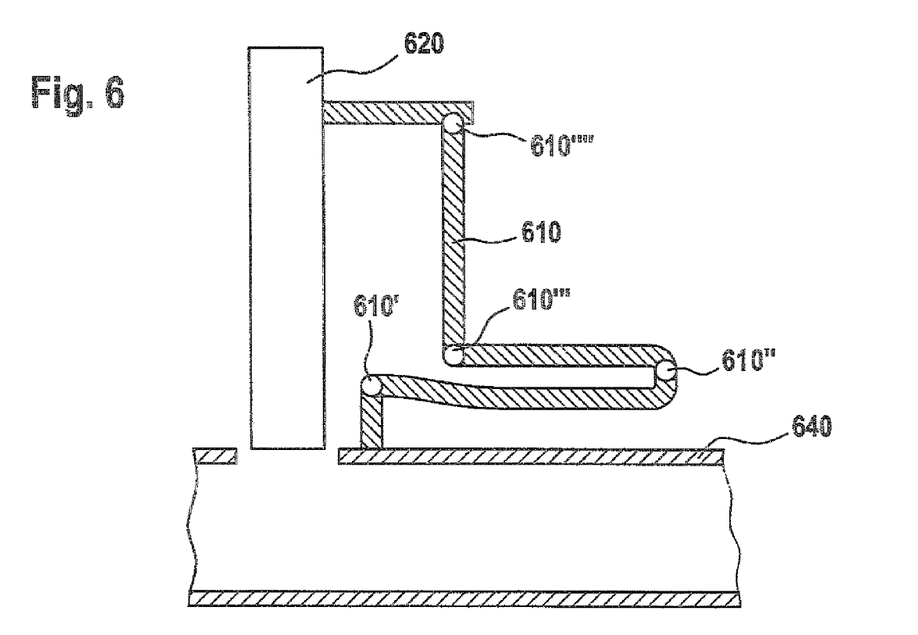
FIG. 6 shows an embodiment of the invention for damping structure-borne sound by absorption as well as by axially elastic retention elements.

FIG. 6 shows an embodiment of the retainer device 610 of the invention that has a plurality of crimped connections. A first sheet-metal part, used for securing to a tailpipe 640, is therefore connected via a crimped connection 610' to a further sheet metal part that forms a lower half of a hollow rib. This lower half of the hollow rib is connected to an upper half of the hollow rib via a further crimped connection 610". A further crimped connection 610''' connects the upper half of the hollow rib to a wall portion. The wall portion connects the hollow rib via a crimped connection 610'''' to a radial retainer portion, which for retaining a metering valve 620 is provided on one end of the metering valve 620, which is located away from the tailpipe 640. By means of the crimped connections 610' through 610'''', additional damping elements are therefore provided, which reduce the structure-borne sound that is conducted by the retainer device 610. Simultaneously, via the radial retainer portion, the embodiment of the invention shown in FIG. 6, provides as soft as possible a coupling of the valve, and the radial retainer portion is preferably embodied like the upper retainer of the metering valve of FIG. 5; that is, it is embodied for instance by means of a flexible axial suspension of low rigidity in the axial direction. In the same way, the hollow rib of the embodiment of FIG. 6, along with the damping by means of the crimped connections 610", 610''', provides a further connection that is highly resilient in the axial direction and that is suitable for damping the noise, especially high-frequency noise, of the metering valve. The main difference between the damping by the crimped connections 610'-610'''' and that of the elastic suspension of FIG. 5 is that the elastic suspension prevents the transmission of vibration by means of strong axial vibrations, while conversely the crimped connections damp the vibrations that have already been transmitted to the retainer device.

Figure 7:
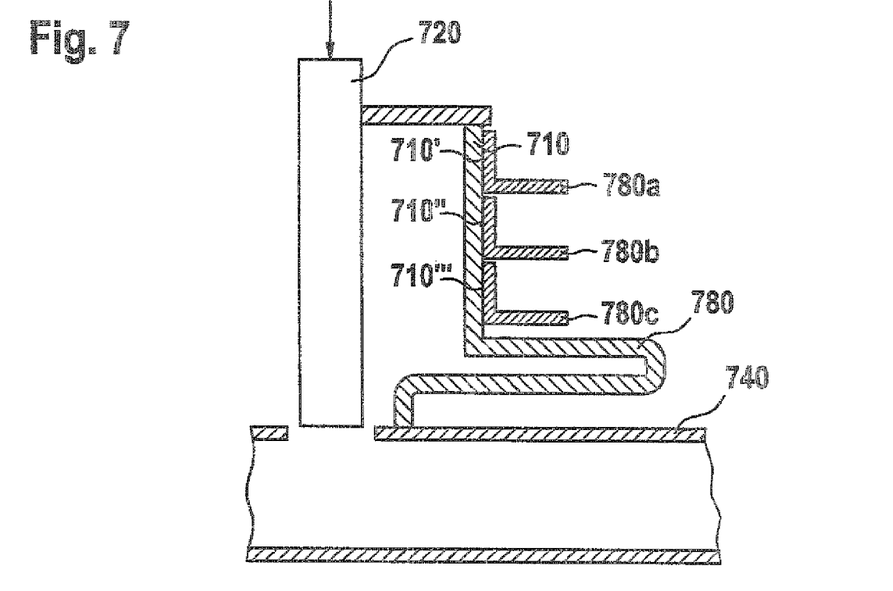
FIG. 7 shows an embodiment of the invention for damping structure-borne sound by absorption as well as by axially elastic retention elements, which furthermore has cooling elements.

FIG. 7 shows an embodiment of the invention in which vibration that has already been transmitted to the retainer device 710 is damped. Alternatively to the damping crimped connections of FIG. 6, in the embodiment of FIG. 7 compression connections are used, which damp vibrations that occur in the retainer device 710. Therefore FIG. 7 likewise has a plurality of sheet-metal parts, which are joined together via compression connections 710'-710'''. Especially these compression connections damp the vibrations that have moved on into the retainer device. In FIG. 7, cooling ribs 780a-780c are pressed onto the retainer device. In this portion, the retainer device includes a cylindrical portion, which has a cylindrical outer surface. The cooling ribs are applied to this outer surface successively all the way around in the axial direction by means of a press fit and almost completely cover the outside of the cylindrical portion of the retainer device. In FIG. 7, a hollow rib 780 is also provided, which because of the low rigidity in the axial direction prevents or damps the coupling of axial vibration from the retainer device to the tailpipe 740.

In a further embodiment, not shown, the individual sheet-metal parts shown in FIGS. 6 and 7 are embodied at least in part or completely of whisper metal, whisper metal being a material with high internal damping. This can be attained for instance by producing a whisper metal sheet from two thin metal sheets between which a vibration-damping structure and/or a vibration-damping material is interposed. As a result, high-frequency structure-borne sound, above all, is damped.

Figure 8:
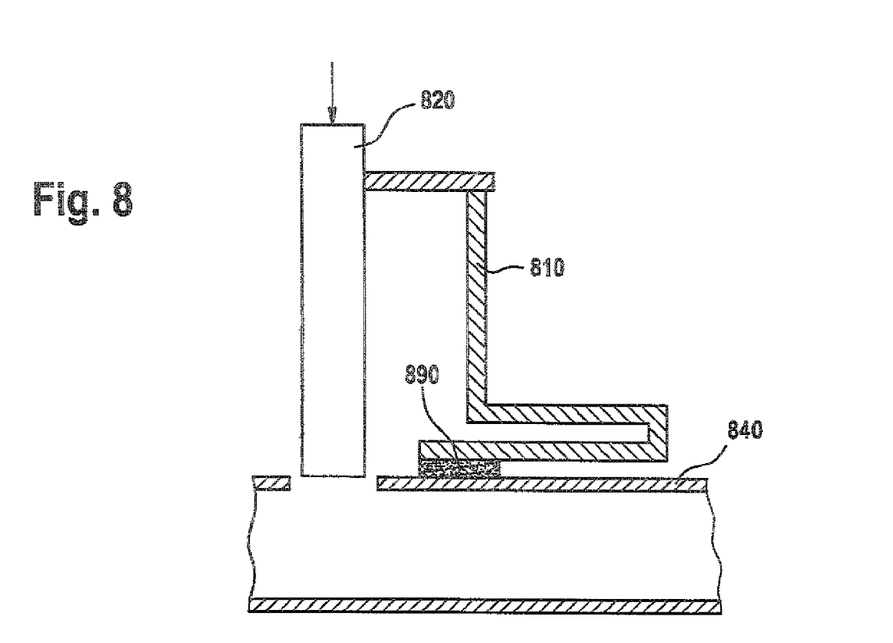
FIG. 8 shows a further embodiment of the invention for damping structure-borne sound by absorption as well as by axially elastic retention elements.

FIG. 8 shows a further embodiment of the retainer device of the invention, in which a ceramic seal 890 is interposed between the retainer device 810 and the tailpipe 840. The ceramic seal thus provides a stable mechanical connection between the retainer device 810 and the exterior of the tailpipe 840. Simultaneously, because of its material properties and its connection properties, the ceramic seal has high internal material damping. The embodiment shown in FIG. 8 again has a hollow rib, whose radial spring action, compared to the axial spring action, is relatively rigid. In other words, the hollow rib prevents the transmission of longitudinal or axial vibration from the retainer device 810 to the tailpipe 840 by means of strong axial spring action, while conversely the ceramic seal 890 provides an added strong damping between the retainer device 810 and the tailpipe 840, in that the ceramic seal 890 for the most part absorbs axial vibration, especially in the high-frequency range.

In a farther, alternative embodiment, not shown, the mass of the metering valve and/or the mass of the retainer device is provided as quite large. As a result, an inertia is attained which reduces the creation and transmission of vibration from the metering valve to the tailpipe connected to the retainer device. As a result, damping particularly of the high frequencies can be attained, since because of the high inertia of the metering valve and/or of the retainer device 810 most of the vibration does not occur and/or is transmitted to the tailpipe.

The provisions mentioned above may be used individually or in combination, to achieve the most effective possible suppression of vibrational noise. The provisions apply individually to the reduced emission of airborne sound from the metering valve, the retainer device, or the tailpipe as well, which can equally be acoustically damped. These provisions furthermore pertain to reducing the transmission of structure-borne sound from the metering valve to the retainer device and from the retainer device to the tailpipe. The provisions furthermore include damping of structure-borne sound already introduced into the retainer device, for instance by means of defined structures or types of connection, such as crimping or a press fit. The use of the elastic materials and/or structures therefore on the one hand prevents the transmission of structure-borne sound and furthermore serves to absorb structure-borne sound and airborne sound. The transmission of structure-borne sound is provided in general by introducing sudden changes in impedance into the media that form the transmission route of the structure-borne sound. The transition of the structure-borne sound into airborne sound by emission over a large area can also be suppressed, for instance by using small surface areas or suitable materials that reduce the emission of airborne sound through a body. The elastic materials and the connection techniques considered are suitable in particular for damping high-frequency airborne sound and structure-borne sound. The focus particularly on high-frequency sound in this document is due to the special sensitivity of human ear to high frequencies. Moreover, high frequencies are transmitted more strongly than low frequencies by most typical mechanical components. Furthermore, high frequencies are suitable above all for inducing resonance in small cavities, such as in tailpipes. Finally, when one mechanical part strikes another, as in the case of the closure of the metering valve, noise with primarily high frequency components occurs, similar to the Si function. For these reasons, emphasis is placed on the damping in particular of the high-frequency components of structure-borne sound and airborne sound.

The suspension of the metering valve, in the embodiments considered, is a two-point suspension; the metering valve extending axially in the longitudinal direction, perpendicularly to the tailpipe, is retained at two points, which are spaced apart from one another. Alternatively, a three-point suspension may be used, or a retainer may be provided which retains the metering valve over a certain portion in such a way that even in the presence of vibration, the position in the radial plane hardly changes. Furthermore, the retainer of the metering valve is generally provided such that axial motions are possible to a certain extent, since the vibrations in the axial direction occur substantially more strongly than in the vertical direction, and damping with very low rigidity in the axial direction is therefore advantageous.

The foregoing relates to the preferred exemplary embodiments of the invention, it being understood that other variants and embodiments thereof are possible within the spirit and scope of the invention, the latter being defined by the appended claims.

Drawing Captions
FIG. 4b
Ventil=valve
Halterung=retainer
Abgasrohr=tailpipe
FIG. 4c
Halterung=retainer

The invention claimed is:

1. A retainer device for retaining a reducing agent metering valve, comprising:
    an inner chamber defined by an inner surface of the retainer device, said inner chamber receiving a valve body of the reducing agent metering valve; and
    a sound-damping device, which damps sonic vibrations emerging from the inner chamber, wherein the sound damping device is embodied at least partially by the retainer device.

2. The retainer device as defined by claim 1, wherein the sound-damping device is equipped with airborne-sound-damping elements.

3. The retainer device as defined by claim 2, wherein the airborne-sound-damping elements are permeable to air and offer an increased flow resistance.

4. The retainer device as defined by claim 2, wherein the airborne-sound-damping elements damp airborne sound by means of phase-offset vibration superposition.

5. The retainer device as defined by claim 3, wherein the airborne-sound-damping elements damp airborne sound by means of phase-offset vibration superposition.

6. The retainer device as defined by claim 1, wherein the sound-damping device includes an elastic element, which at least partially surrounds the inner chamber and damps structure-borne sound emerging from the inner chamber.

7. The retainer device as defined by claim 2, wherein the sound-damping device includes an elastic element, which at least partially surrounds the inner chamber and damps structure-borne sound emerging from the inner chamber.

8. The retainer device as defined by claim 3, wherein the sound-damping device includes an elastic element, which at least partially surrounds the inner chamber and damps structure-borne sound emerging from the inner chamber.

9. The retainer device as defined by claim 1, wherein the sound-damping device further includes an elastic connection element, which damps structure-borne sound that originates from vibration of the reducing agent metering valve, and which provides an elastic interface for securing the retainer device to an exhaust system device.

10. The retainer device as defined by claim 8, wherein the sound-damping device further includes an elastic connection element, which damps structure-borne sound that originates from vibration of the reducing agent metering valve, and which provides an elastic interface for securing the retainer device to an exhaust system device.

11. The retainer device as defined by claim 1, wherein the sound-damping device further includes two elastic suspension elements, which damp structure-borne sound and each provide an elastic suspension interface for the reducing agent metering valve and are spaced apart from one another along a longitudinal axis of the retainer device.

12. The retainer device as defined by claim 10, wherein the sound-damping device further includes two elastic suspension elements, which damp structure-borne sound and each provide an elastic suspension interface for the reducing agent metering valve and are spaced apart from one another along a longitudinal axis of the retainer device.

13. The retainer device as defined by claim 9, wherein the elastic element and/or the elastic connection element has high elasticity in the actuation direction of an actuator of the reducing agent metering valve.

14. The retainer device as defined by claim 11, wherein the elastic element and/or at least one of the two elastic suspension elements has high elasticity in the actuation direction of an actuator of the reducing agent metering valve.

15. The retainer device as defined by claim 9, wherein the elastic connection element is a seal for receiving at least one portion of the reducing agent metering valve, and the seal is arranged for retaining the reducing agent metering valve elastically in the retainer device and for damping the transmission of structure-borne sound, which originates at the reducing agent metering valve, to the retainer device.

16. The retainer device as defined by claim 11, wherein one of the two elastic suspension elements is a seal for receiving at least one portion of the reducing agent metering valve, and the seal is arranged for retaining the reducing agent metering valve elastically in the retainer device and for damping the transmission of structure-borne sound, which originates at the reducing agent metering valve, to the retainer device.

17. The retainer device as defined by claim 1, further comprising a head region, which cylindrically surrounds a head room for receiving a closing portion of the reducing agent metering valve and has circumferentially disposed airborne-sound-damping openings.

18. The retainer device as defined by claim 12, further comprising a head region, which cylindrically surrounds a head room for receiving a closing portion of the reducing agent metering valve and has circumferentially disposed airborne-sound-damping openings.

19. The retainer device as defined by claim 1, further comprising radially extending cooling ribs, which are equipped with airborne-sound-damping openings.

20. The retainer device as defined by claim 18, further comprising radially extending cooling ribs, which are equipped with airborne-sound-damping openings.

21. A retainer device for retaining a reducing agent metering valve, comprising:
    an inner chamber at least partially enclosed by the retainer device, said inner chamber receiving the reducing agent metering valve; and
    a sound-damping device, which damps sonic vibrations emerging from the inner chamber, the sound damping device being embodied at least by an inner surface of the retainer device defining the inner chamber, wherein a minimal spacing is provided between an outside of the reducing agent metering valve and the inner surface of the retainer device.

* * * * *